(12) United States Patent
Inoue et al.

(10) Patent No.: US 9,234,746 B2
(45) Date of Patent: Jan. 12, 2016

(54) INSPECTION METHOD AND INSPECTION APPARATUS OF WINDING STATE OF SHEET MEMBER

(75) Inventors: Hiroki Inoue, Osaka (JP); Kazuhiro Kobayashi, Osaka (JP); Nobuhiro Tani, Osaka (JP); Toshihide Suzuki, Osaka (JP)

(73) Assignee: TOYO TIRE & RUBBER CO., LTD., Osaka-shi, Osaka (JP)

( * ) Notice: Subject to any disclaimer, the term of this patent is extended or adjusted under 35 U.S.C. 154(b) by 384 days.

(21) Appl. No.: 13/532,000

(22) Filed: Jun. 25, 2012

(65) Prior Publication Data

US 2013/0009078 A1 Jan. 10, 2013

(30) Foreign Application Priority Data

Jul. 5, 2011 (JP) ................. 2011-149408

(51) Int. Cl.
*G01N 21/86* (2006.01)
*G01B 11/24* (2006.01)
*B29D 30/30* (2006.01)
*G01B 11/02* (2006.01)

(52) U.S. Cl.
CPC ............ *G01B 11/24* (2013.01); *B29D 30/3007* (2013.01); *G01B 11/026* (2013.01); *B29D 2030/3064* (2013.01)

(58) Field of Classification Search
CPC .................................................... G01N 21/86
USPC .................. 250/559.38; 348/86–92
See application file for complete search history.

(56) References Cited

U.S. PATENT DOCUMENTS

| 6,108,030 A | * | 8/2000 | Yamamoto et al. ............ 348/91 |
| 2006/0213384 A1 | * | 9/2006 | Reinhard et al. ............ 101/216 |
| 2008/0158332 A1 | * | 7/2008 | Ackley et al. ................ 347/264 |
| 2009/0260744 A1 | | 10/2009 | Bobinger et al. |
| 2011/0216190 A1 | * | 9/2011 | Shimazu et al. ............ 348/135 |

FOREIGN PATENT DOCUMENTS

| JP | 03-274406 A | 12/1991 |
| JP | 06-002051 A | 1/1994 |
| JP | 07-332926 A | 12/1995 |
| JP | 2001-201335 A | 7/2001 |
| JP | 2004-257915 A | 9/2004 |

(Continued)

OTHER PUBLICATIONS

Chinese Office Action dated Aug. 5, 2014, issued in corresponding Chinese Application No. 201210232890.X; w/English Translation. (15pages).

(Continued)

*Primary Examiner* — Seung C Sohn
(74) *Attorney, Agent, or Firm* — Westerman, Hattori, Daniels & Adrian, LLP (57) ABSTRACT

Laser light is emitted to a sheet member wound on a forming drum in a range which includes the entire width of the sheet member and distance data on a distance to a reflecting surface is obtained, using a two-dimensional laser sensor which has a detection range along a drum circumferential direction, while moving either the two-dimensional laser sensor or the forming drum in a drum width direction. Further, the positions of width-directional opposite end sections of the sheet member are calculated on the basis of the obtained distance data.

18 Claims, 10 Drawing Sheets

(56) References Cited

FOREIGN PATENT DOCUMENTS

| | | |
|---|---|---|
| JP | 2004-354258 A | 12/2004 |
| JP | 2005-019544 A | 1/2005 |
| JP | 2009-533246 A | 9/2009 |
| JP | 2009-294182 A | 12/2009 |
| JP | 2010-101721 A | 5/2010 |
| JP | 2010-112827 A | 5/2010 |
| JP | 2010-249702 A | 11/2010 |

OTHER PUBLICATIONS

Japanese Notification of Reasons of Refusal dated Jan. 20, 2015, issued in Japanese Application No. 2011-149408, w/Abridged English translation. (8 pages).

Chinese Office Actiondated Mar. 20, 2015, issued in corresponding Chinese Patent Application No. 2012-10232890.X, with an abridged English translation (10 pages).

* cited by examiner

INSPECTION METHOD AND INSPECTION APPARATUS OF WINDING STATE OF SHEET MEMBER

CROSS-REFERENCE TO RELATED APPLICATIONS

This application is based upon and claims the benefit of priority from the prior Japanese Patent Application No. 2011-149408, filed on Jul. 5, 2011; the entire contents of which are incorporated herein by reference.

BACKGROUND

1. Technical Field

The disclosure relates to an inspection method and an inspection apparatus for inspection of the winding state of a sheet member such as a carcass ply wound on a forming drum in a manufacturing process of a tire for automobiles, for example.

2. Related Art

In the related art, as an inspection method for inspection of the winding state of such a sheet member, a technique which measures an overlap of a joint between a leading end section and a trailing end section of a sheet member wound on a forming drum by a one-dimensional laser sensor while rotating the forming drum at a constant speed is disclosed in JP-A-2004-354258. However, in the one-dimensional laser sensor, only one point of measured value is obtained in a drum width direction even though the sheet member wound on the forming drum is measured over the entire circumference (that is, over 360 degrees) in a drum circumferential direction. Thus, it is difficult to measure the shape of end sections or the width and the attachment position in the width direction of the sheet member in the joint with high accuracy. Further, it is difficult to measure a joint state from the left end to the right end of the sheet member.

On the other hand, JP-A-2009-294182 discloses a technique which measures the positions of width-directional end sections of a sheet member by continuously detecting thickness-directional contour data in the width-directional end sections of the sheet member wound on a forming drum, in the length direction of the sheet member, using a two-dimensional laser sensor. In this way, by using the two-dimensional laser sensor, the detection is performed in a surface shape along a circumferential direction as a forming drum is rotated in a state where the two-dimensional laser sensor is set to have a detection range along a drum axial direction. Thus, in order to accurately measure the positions of the width-directional opposite end sections of the sheet member, it is necessary to accurately align, in a state where two-dimensional laser sensors are respectively disposed at the opposite end sections, the distance between two two-dimensional laser sensors. Further, in order to measure a joint state of a broad-width sheet member such as a carcass ply over the entire width thereof, it is necessary to install a plurality of two-dimensional laser sensors to secure a detection range of the two-dimensional laser sensor over the entire width direction thereof.

Further, JP-A-2001-201335 discloses a technique which measures the positions of width-directional opposite end sections of a sheet member while moving a pair of one-dimensional laser sensors in the width direction of the sheet member. In this technique, the positions of end sections of sheet materials stacked on a conveyor are detected. In the case of such sheet materials, the positions of end sections may be measured even with the one-dimensional laser sensor. However, in the case of a sheet member wound on a forming drum, since a joint has a discontinuous shape, it is difficult to perform measurement with the one-dimensional laser sensor with high accuracy.

SUMMARY

An advantage of some aspects of an embodiment is to provide an inspection method and an inspection apparatus which can measure a winding state of a sheet member wound on a forming drum using a two-dimensional laser sensor with high accuracy.

According to a first aspect of an embodiment, there is provided an inspection method of a winding state of a sheet member wound on a forming drum, including: emitting laser light to the sheet member wound on the forming drum in a range which includes the entire width of the sheet member and obtaining distance data on a distance to a reflecting surface, using a two-dimensional laser sensor which has a detection range along a drum circumferential direction, while moving any one of the two-dimensional laser sensor and the forming drum in a drum width direction; and calculating the positions of width-directional opposite end sections of the sheet member on the basis of the distance data.

According to a second aspect of an embodiment, there is provided an inspection apparatus of a winding state of a sheet member wound on a forming drum, including: a two-dimensional laser sensor which has a detection range along a drum circumferential direction; a movement device which moves any one of the two-dimensional laser sensor and the forming drum in a drum width direction; a data obtaining unit which emits laser light by the two-dimensional laser sensor to the sheet member wound on the forming drum in a range which includes the entire width of the sheet member and obtains distance data on a distance to a reflecting surface, as any one of the two-dimensional laser sensor and the forming drum moves in the drum width direction; and a data processing unit which calculates the positions of width-directional opposite end sections of the sheet member on the basis of the distance data.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
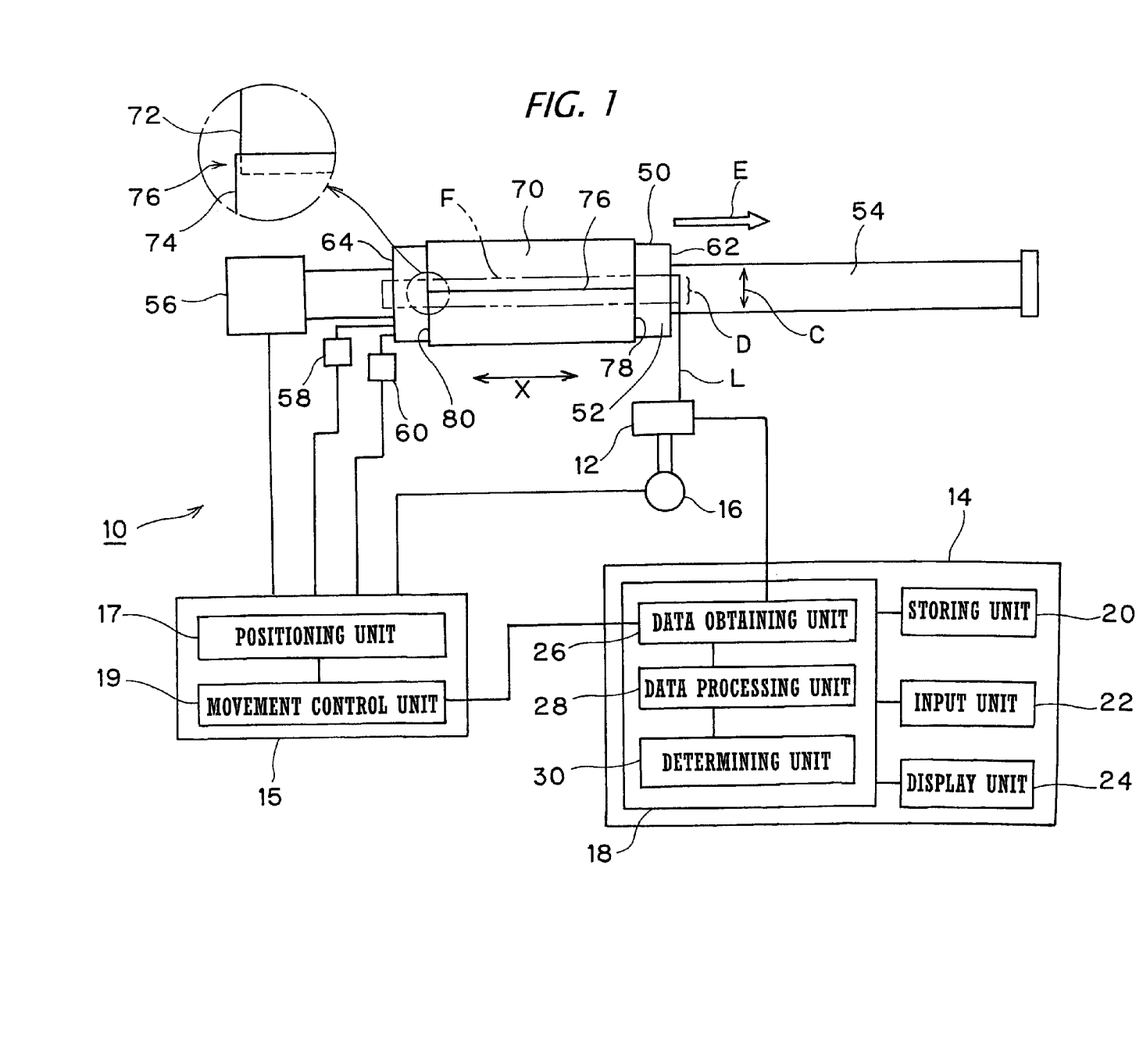
FIG. 1 is a schematic diagram illustrating a configuration of an inspection apparatus according to an embodiment.

As shown in FIG. 1, an inspection apparatus 10 according to an embodiment is a device which inspects a winding state of a sheet member 70 which is wound on a forming drum 50 in a manufacturing process of a pneumatic tire. The inspection apparatus 10 includes a two-dimensional laser sensor 12 which is arranged close to the drum surface 52 of the forming drum 50, a computer 14, and a process control computer 15.

Figure 3:
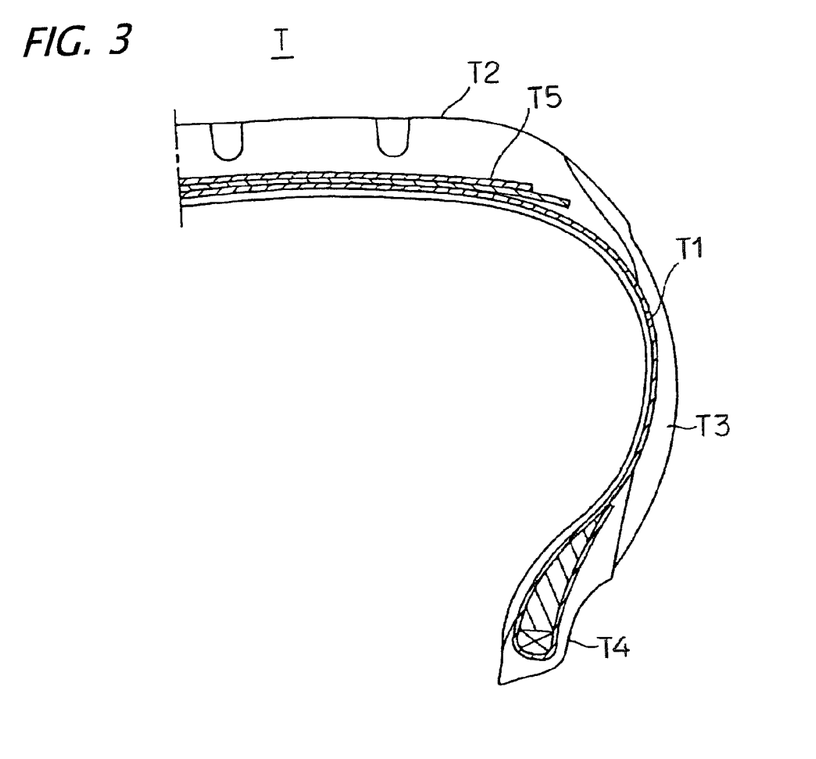
FIG. 3 is a half cross-sectional view illustrating an example of a pneumatic tire.

The forming drum (that is, building drum) 50 is a cylindrical member used when the pneumatic tire is manufactured. The sheet member 70 which forms a part of the pneumatic tire is wound on the forming drum 50. In this example, the sheet member 70 is a carcass ply. Generally, as shown in FIG. 3, a carcass ply T1 is a member which is locked by a pair of bead parts T4 through opposite side wall parts T3 from a tread part T2 in the pneumatic tire T, and is arranged inside a belt T5 in a radial direction thereof in the tread part T2. The carcass ply T1 is configured by a band-like member formed by substantially perpendicularly disposing a plurality of organic fiber codes (that is, carcass codes) with respect to a circumferential direction of the tire and by coating the organic fiber codes by a coating rubber. Before being wound, the plurality of organic fiber codes is disposed along the width direction.

Figure 2:
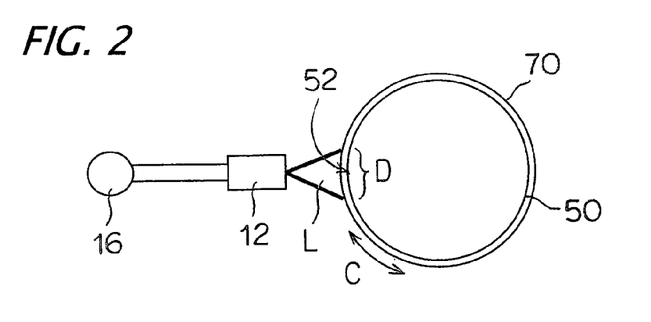
FIG. 2 is a side view of the inspection apparatus.

In the manufacturing process shown in FIGS. 1 and 2, the band-like sheet member 70 which forms the carcass ply is wound on an outer circumferential surface of the cylindrical forming drum 50 and has a cylinder shape as a whole. By winding the band-like sheet member 70 in this way, as shown in FIG. 1, a joint 76 which is configured by overlapping a leading end section 72 and a trailing end section 74 is formed in the wound sheet member 70. The joint 76 extends along a drum width direction (that is, the width direction of the forming drum 50, which is the same as a drum axial direction) X, and is formed over the entire width of the sheet member 70. In the example shown in FIG. 1, by overlapping the trailing end section 74 on a lower side in the figure which is a winding terminating end on the leading end section 72 on an upper side in the figure which is a winding starting end, the joint 76 is formed.

As a movement device which moves the forming drum 50 in a direction E along the drum width direction X, a traveling rail 54 which extends in the drum width direction X and a travel driving motor 56 which drives the forming drum 50 along the traveling rail 54 are installed in the forming drum 50. The traveling rail 54 is a rail which is installed under the forming drum 50, and guides the forming drum 50 to travel (slide) in the drum width direction X by the driving of the motor 56.

A rotation driving motor 58 is installed to the forming drum 50, and the forming drum 50 is able to rotate by the motor 58. Further, a rotation position sensor 60 is installed as a rotation detecting unit which detects the rotation position of the forming drum 50.

A two-dimensional laser sensor 12 is a position sensor (displacement sensor) which emits two-dimensional laser light L which has a planar spread and receives reflected light to measure a spatial distance to a reflecting surface, and may employ a known two-dimensional laser sensor. As shown in FIGS. 1 and 2, the two-dimensional laser sensor 12 is installed to have a linear detection range D along a drum circumferential direction C, on the outside the forming drum 50 in the radial direction. That is, the two-dimensional laser sensor 12 is installed so that the laser light L which is emitted from the two-dimensional laser sensor 12 is perpendicular to the drum width direction X. The detection range D is not particularly limiting, but is preferably 20 mm to 100 mm, and more preferably 30 mm to 60 mm so that the joint 76 is within the detection range D.

A servo motor 16 for positioning the two-dimensional laser sensor 12 is installed to the two-dimensional laser sensor 12 so that the distance between the two-dimensional laser sensor 12 and the forming drum 50 is constant. In this way, by positioning the distance between the two-dimensional laser sensor 12 and the forming drum 50 by the servo motor 16, it is possible to automatically maintain a constant distance even though the diameter of the forming drum 50 is changed.

The two-dimensional laser sensor 12 is connected to the computer 14. The servo motor 16, the motors 56 and 58 on the side of the forming drum 50 and the rotation position sensor 60 are connected to the process control computer 15. The process control computer 15 is connected to the computer 14, and transmits information about the servo motor 16, the motors 56 and 58 of the forming drum 50 and the rotation position sensor 60 to the computer 14. As the computer 14, a normal personal computer may be used. The process control computer 15 is a part of a computer which controls a manufacturing process of the pneumatic tire.

The process control computer 15 includes, as its function, a positioning unit 17 which controls the servo motor 16 and the motors 56 and 58 of the forming drum 50 to position the forming drum 50 and the two-dimensional laser sensor 12, and a movement control unit 19 which controls the travel driving motor 56 to move the forming drum 50 in the direction E along the drum width direction X. Further, in a state where the forming drum 50 and the two-dimensional laser sensor 12 are positioned by the positioning unit 17, the forming drum 50 is moved by the movement control unit 19. Further, at the same time, a movement start signal is transmitted to the computer 14.

The computer 14 includes an arithmetic processing unit (CPU) 18, a storing unit 20 which includes a known hard disk, an input unit 22 which includes a keyboard or the like, and a display unit 24 such as a monitor.

Figure 4:
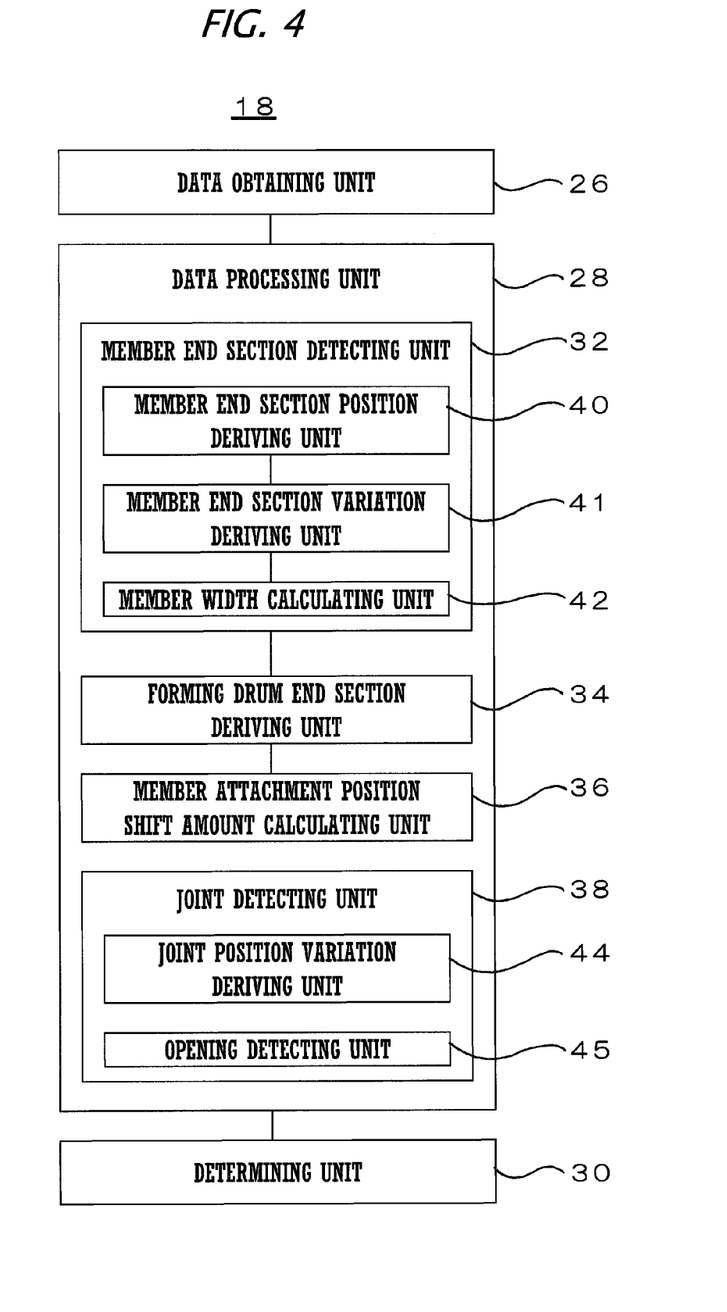
FIG. 4 is a block diagram illustrating a configuration of an arithmetic processing unit in the inspection apparatus.

The arithmetic processing unit 18 reads a processing program from the storing unit 20 when the computer 14 starts up, and serves as a data obtaining unit 26, a data processing unit 28, a determining unit 30, and the like.

The data obtaining unit 26 obtains distance data (Z-directional displacement) on a distance to the reflecting surface by emitting laser light L to the sheet member 70 wound on the forming drum 50 by the two-dimensional laser sensor 12, according to the movement of the forming drum 50 in the drum width direction X. More specifically, the data obtaining unit 26 obtains the distance data by the two-dimensional laser sensor 12 at the same time when the forming drum 50 starts movement, on the basis of the movement start signal from the movement control unit 19. The obtainment of the distance data through emission of the laser light L is performed in a range which includes the entire width of the sheet member 70. In this example, the inside of a chain-lined frame indicated by a sign F in FIG. 1 is the obtainment range of the distance data. Setting is performed so that the distance data is obtained in the range which includes the entire width of the forming drum 50 (that is, a wider range in the drum width direction which includes the entire width of the forming drum 50) so that the entire of the forming drum 50 in the width direction is within the number of measurement frames through the two-dimensional laser sensor 12.

Thus, the distance data is obtained in a matrix form in which a plurality of pieces (for example, 10 to 800 points) of distance data which are arranged in the drum width direction X forms a "row" and a plurality of pieces (for example, 10 to 300 points) of distance data which are arranged in the drum circumferential direction C forms a "column". In this matrix, the data array which is arranged in the drum width direction X, which forms the row, corresponds to the number of measurement frames of each laser emitting element of the two-dimensional laser sensor 12, and the array direction corresponds to the X axial direction. Further, the data array which is arranged in the drum circumferential direction C, which forms the column, corresponds to the detection range D of the two-dimensional laser sensor 12, and the array direction corresponds to the Y axial direction.

The data processing unit 28 calculates the positions of width-directional opposite end sections 78 and 80 of the sheet member 70, on the basis of the obtained distance data. As shown in FIG. 4, the data processing unit 28 includes a member end section detecting unit 32, a forming drum end section deriving unit 34, a member attachment position shift amount calculating unit 36, and a joint detecting unit 38, in this example.

The member end section detecting unit 32 detects the width-directional opposite end sections 78 and 80 of the sheet member 70 on the basis of the distance data, and includes a member end section position deriving unit 40, a member end section variation deriving unit 41, and a member width calculating unit 42.

The member end section position deriving unit 40 detects the width-directional ends of the sheet member 70 for each row along the X axial direction on the basis of the distance data which is obtained in the matrix form, and calculates the positions of the width-directional opposite end sections 78 and 80 of the sheet member 70 on the basis of the detection result. In this example, among the width-directional ends detected for the respective rows, the largest width-directional positions are specified as the positions of the width-directional opposite end sections 78 and 80 of the sheet member 70, respectively.

The member end section variation deriving unit 41 derives variation of the width-directional position in the width-directional opposite end sections 78 and 80 of the sheet member 70 on the basis of the width-directional ends detected for each row. As a result of derivation of variation of the width-directional positions, if the variation is large, it can be detected that the joint 76 (that is, the overlap of the leading end section 72 and the trailing end section 74) is shifted in the drum width direction X.

The member width calculating unit 42 calculates the width size of the sheet member 70 from the positions of the width-directional opposite end sections 78 and 80 of the sheet member 70 as specified above.

The forming drum end section deriving unit 34 derives the positions of the width-directional opposite end sections 62 and 64 of the forming drum 50 on the basis of the distance data. More specifically, by summing the number of non-detection points which have distance data which exceeds a measurement limit of the two-dimensional laser sensor 12 in the drum circumferential direction C on the basis of the distance data obtained in the matrix form and by comparing the sum with a threshold value, the positions of the width-directional opposite end sections 62 and 64 of the forming drum 50 are calculated.

The member attachment position shift amount calculating unit 36 detects the amount of shift of the sheet member 70 in the drum width direction X for attachment to the forming drum 50. Specifically, the member attachment position shift amount calculating unit 36 calculates respective width-directional central positions (that is, central positions in the drum width direction X) from the positions of the width-directional opposite end sections 78 and 80 of the sheet member 70 and the positions of the width-directional opposite end sections 62 and 64 of the forming drum 50, as calculated above. Further, the member attachment position shift amount calculating unit calculates the shift amount of the width-directional central position of the sheet member 70 with respect to the width-directional central position of the forming drum 50.

The joint detecting unit 38 detects a joint state of the joint 76 of the sheet member 70 on the basis of the distance data, and includes a joint position variation deriving unit 44 and an opening detecting unit 45.

The joint position variation deriving unit 44 detects a joint position between the leading end section 72 and the trailing end section 74 of the sheet member 70 for each row along the Y axial direction on the basis of the distance data obtained in the matrix form, and derives variation of the detected joint position (variation due to shift of the joint position in the drum circumferential direction C). Specifically, in detection of the joint position, a change between the pieces of distance data which are adjacent to each other in the drum circumferential direction C is calculated for each column, and a position where the change becomes the maximum in the drum circumferential direction C is detected as the joint position of the sheet member 70. In deriving variation of the joint position in this way, if the variation is large, it may be detected that the joint 76 is disordered.

The opening detecting unit 45 detects an opening section 82 (see FIG. 10A) in the joint 76 of the sheet member 70. The opening section 82 is a concave portion generated as the leading end section 72 and the trailing end section 74 do not partly overlap in the width direction in the joint 76, and is a non-joint portion which is formed in a part of the joint 76. The opening detecting unit 45 calculates a difference between the pieces of distance data which are adjacent to each other in the drum circumferential direction C for each column, on the basis of the distance data obtained in the matrix form, and adds the differences which are equal to or larger than a threshold value in absolute values for each column, to thereby detect whether the concave portion due to the opening section 82 is present in the joint 76 in the drum circumferential direction C.

The determining unit 30 performs determination with respect to the respective measurement results of the width of the sheet member 70, the shift amount of the attachment position, the variation of the end section position, the variation of the joint position in the joint 76 and the presence or absence of the opening section 82, on the basis of a determination reference input through the input unit 22 in advance. Further, the determination result is displayed on the display unit 24 together with each measurement result, and also is stored in the storing unit 20.

Figure 5:
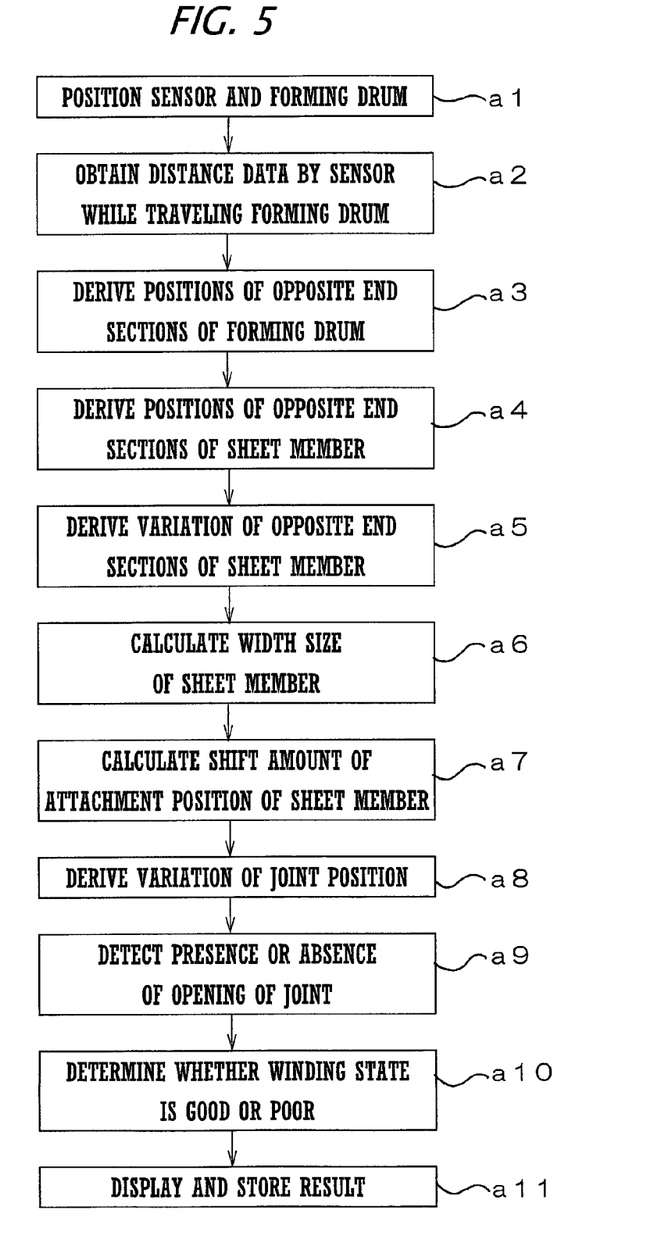
FIG. 5 is a flowchart illustrating the flow of processes according to an embodiment.

Next, the flow of the processes will be described with reference to a flowchart of FIG. 5.

Firstly, in step a1, as shown in FIGS. 1 and 2, positioning of the two-dimensional laser sensor 12 and the forming drum 50 is performed by the positioning unit 17 of the process control computer 15. Specifically, the two-dimensional laser sensor 12 and the forming drum 50 are positioned by the servo motor 16 so that the distance between the two-dimensional laser sensor 12 and the forming drum 50 is constant.

Further, the rotation position of the forming drum 50 and the two-dimensional laser sensor 12 are aligned using the rotation position sensor 60 and the motor 58 so that the joint 76 of the sheet member 70 which is wound on the forming drum 50 is within the detection range D of the two-dimensional laser sensor 12. In this example, the rotation angle of the forming drum 50 is aligned so that the joint 76 is disposed at the center of the detection range D of the two-dimensional laser sensor 12.

Then, in step a2, while moving the forming drum 50 in the drum width direction X, the laser light L is emitted to the sheet member 70 which is wound on the forming drum 50 by the two-dimensional laser sensor 12 to obtain the distance data on the distance to the reflecting surface.

Specifically, after the forming drum 50 is paused at the measurement starting position which is disposed immediately before the two-dimensional laser sensor 12, the forming drum 50 is traveled at a constant speed in the drum width direction X by the movement control unit 19. Further, at the same time when the forming drum 50 starts to move, the measurement through the two-dimensional laser sensor 12 is initiated by the data obtaining unit 26. Here, the measurement starting position and the traveling speed are determined so that the entire width of the sheet member 70, in this example, the entire width direction of the forming drum 50 is within the number of measurement frames of the two-dimensional laser sensor 12. As shown in FIG. 1, in the measurement starting position, the irradiation position of the laser light through the two-dimensional laser sensor 12 is not disposed in the range of the forming drum 50 in the drum width direction X, but is disposed in front of the movement direction (on the right side in FIG. 1), with reference to the leading end section 62 (right end in FIG. 1) of the forming drum 50 in the movement direction E. While moving the forming drum 50 in the drum width direction X from the measurement starting position, the measurement through the two-dimensional laser sensor 12 is performed. The measurement is continuously performed from one end to the other end of the forming drum 50 in the width direction X, by the two-dimensional laser sensor 12 which has the measurement range D in the drum circumferential direction C.

Thus, the distance data (Z-directional displacement) is obtained in a matrix form in which a plurality of pieces of distance data which is arranged at a constant interval in the drum width direction X over the entire width of the forming drum 50 forms a "row" along the X axial direction and a plurality of pieces of distance data which is arranged at a constant interval in the drum circumferential direction C corresponding to the detection range D of the two-dimensional laser sensor 12 forms a "column" along the Y axial direction. The obtained distance data is stored in the storing unit 20 once.

Next, in step a3, the positions of the width-directional opposite end sections 62 and 64 of the forming drum 50 are derived on the basis of the obtained distance data, by the forming drum end section deriving unit 34. The derivation is performed by summing the number of non-detection points which has distance data which exceeds the measurement limit of the two-dimensional laser sensor 12 in the drum circumferential direction C (Y axial direction) and by comparing the summed number with a threshold value.

Figure 6A:
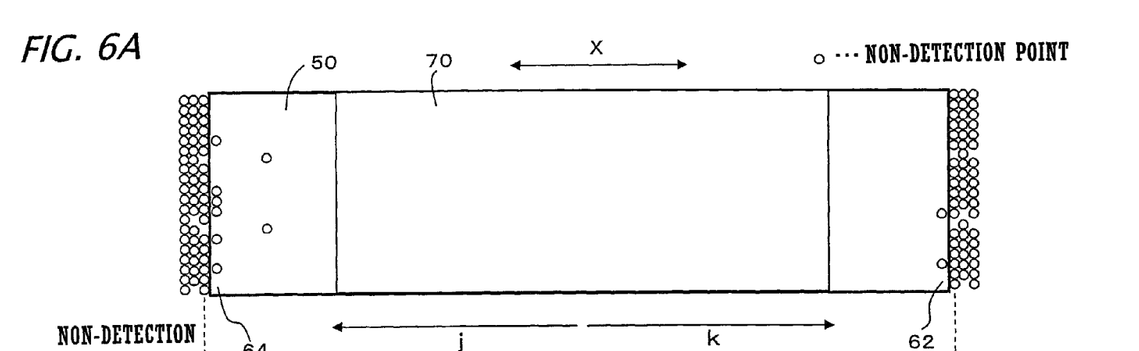
FIGS. 6A and 6B are diagrams illustrating a method of detecting the position of an end section of a forming drum.
Figure 6B:
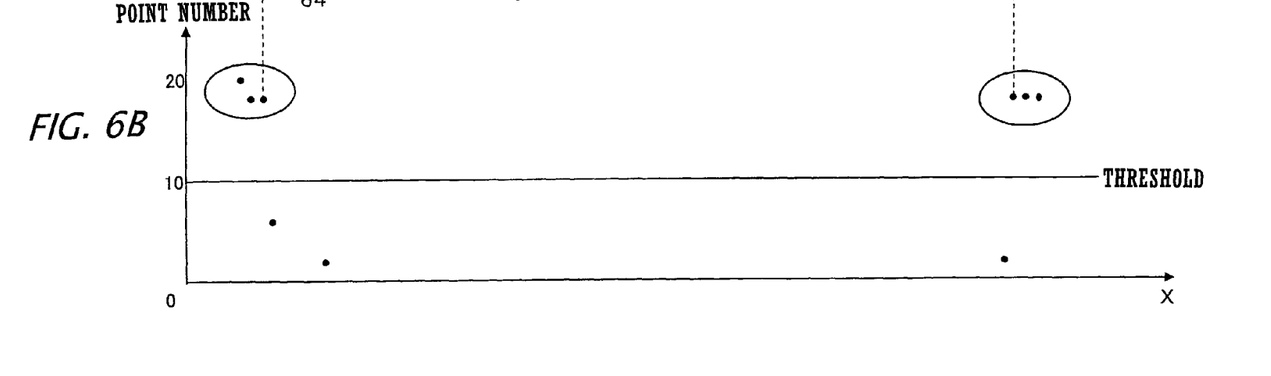

An example of the derivation of the width-directional end section position will be described in detail with reference to FIGS. 6A and 6B. Measurement points (non-detection points) which have distance data having the size which exceeds the measurement limit of the two-dimensional laser sensor 12 are checked from the central position toward opposite ends in the drum width direction X (see arrows j and k in FIG. 6A) with respect to the distance data obtained in the matrix form. In the two-dimensional laser sensor 12, since the reflected light is not detected if the distance up to the irradiation target exceeds a predetermined value, the measurement points become the non-detection points. As shown in FIGS. 6A and 6B, if the check is performed from the central position along the arrows j and k, on the outside which is beyond the width-directional opposite end sections 62 and 64 of the forming drum 50, the reflected light cannot be detected, and thus, the measurement points become the non-detection points. Accordingly, the point where the non-detection points appear may be recognized as a drum end.

Here, as shown in FIG. 6A, even though the measurement points are actually in the range of the forming drum 50, the non-detection points where the reflected light is not detected may be obtained. Thus, in consideration of such a measurement error, in this example, the width-directional end section position of the forming drum 50 is derived as follows. That is, on the same X axis (that is, each row), the number of the non-detection points is checked. The number of the non-detection points is summed along the drum circumferential direction C (that is, along the Y axial direction), and if the summed number is smaller than a threshold value, it is determined that the width-directional position is not the width-directional end section position of the forming drum 50. On the other hand, if the summed number of the non-detection points is equal to or larger than the threshold value, the width-directional position may be specified as the width-directional end section position of the forming drum 50. More preferably, when a plurality of (for example, three) lines where the summed number of the non-detection points is equal to or larger than the threshold value continuously appears, the width-directional positions of the innermost line may be specified as the width-directional end section positions of the forming drum 50. Thus, it is possible to enhance the detection accuracy of the width-directional end sections 62 and 64 of the forming drum 50. The threshold value may be half the number of distance data (measurement points) in the drum circumferential direction C (in an example of FIG. 6B, the threshold value is 10 points with respect to 20 measurement points in the drum circumferential direction C).

Next, in step a4, the positions of the width-directional opposite end sections 78 and 80 of the sheet member 70 are derived by the member end section position deriving unit 40. Here, the derivation is performed by detecting the width-directional ends of the sheet member 70 for each row on the basis of the distance data which is obtained in the matrix form, and by calculating the positions of the width-directional opposite end sections 78 and 80 of the sheet member 70 on the basis of the detection result.

Figure 7A:
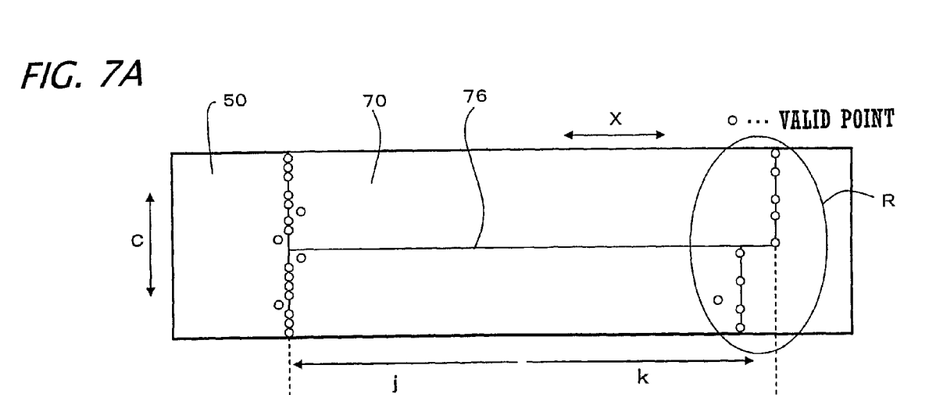
FIG. 7A to 7C are diagrams illustrating a method of detecting the position of an end section of a sheet member.
Figure 7B:
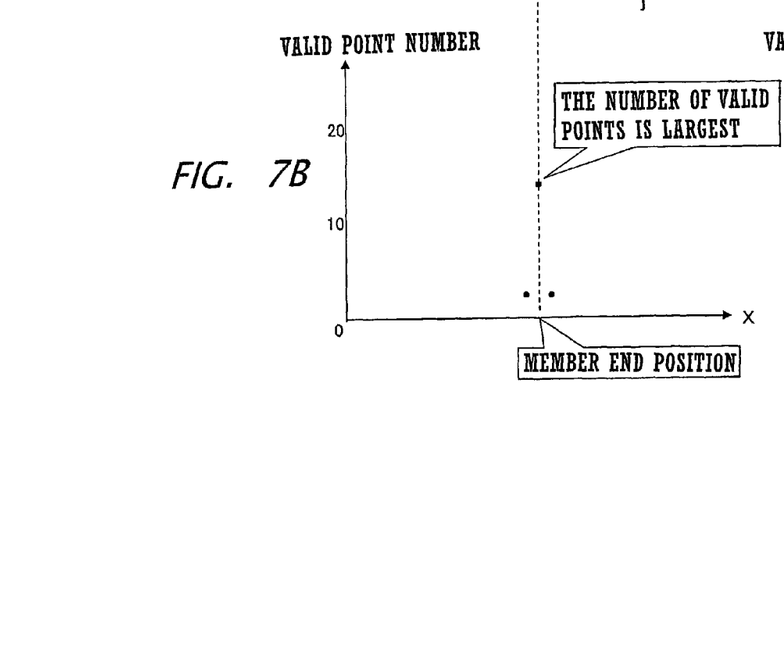

An example of the derivation of the member end section positions will be described in detail with reference to FIGS. 7A and 7B. A difference between every two measurement points is calculated from the central position toward the opposite ends (see arrows j and k in FIG. 7A) in the drum width direction X with respect to the distance data obtained in the matrix form, and measurement points where the difference is equal to or larger than a threshold value necessary for detecting the thickness of the sheet member 70 are used as valid points. The width-directional positions of the valid points are detected as the width-directional ends of the sheet member 70 in the respective rows. In each row, the check is completed at a time point when such measurement points which are equal to or larger than the threshold value are detected, and the valid points are checked with respect to all the rows. The check of the valid points may be ended before reaching the width-directional end section positions of the forming drum 50 as derived above.

Figure 7C:
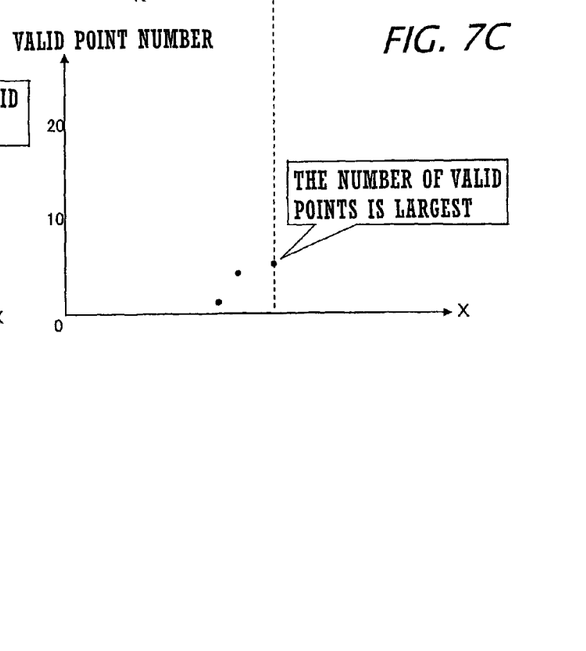

After the valid points as the width-directional ends of the sheet member 70 for the respective rows are detected, among the width-directional ends detected for the respective rows, the largest width-directional positions are specified as the positions of the width-directional opposite end sections of the sheet member 70. For example, in the end section on the left side in FIG. 7A, as shown in FIG. 7B, the width-directional positions where the number of valid points which are summed in the drum circumferential direction C is the largest may be specified as the member end section positions. On the other hand, in the end section on the right side in FIG. 7A, the width-directional positions where the number of valid points shown in FIG. 7C is the largest may be specified as the member end section positions. However, on the right side end section, as surrounded by a frame R in FIG. 7A, the total number of the valid points is obviously small. In a case where the total number of the valid points is small in this way, there is a possibility that a measurement error is included. Thus, in a case where the total number of the valid points is a predetermined threshold value or less, this may be considered as a non-detection of the member end sections to result in a procedure such as re-measurement. Here, the threshold value may be half the number of distance data in the drum circumferential direction C. In a case where two or more the width-directional positions where the number of valid points is the largest are detected, for example, the width-directional positions close to the width-directional center of the sheet member 70 may be specified as the member end section positions.

Next, in step a5, the variation of the width-directional opposite end sections 78 and 80 of the sheet member 70 is derived by the member end section variation deriving unit 41. In the derivation, the variation of the width-directional position is calculated on the basis of the width-directional ends detected for each row.

Figure 8A:
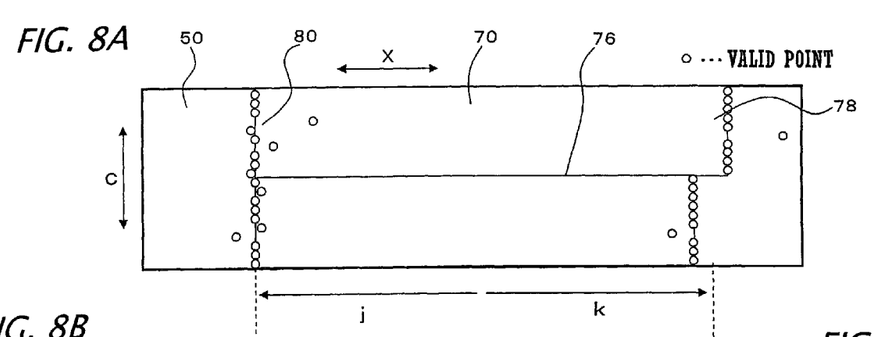
FIG. 8A to 8C are diagrams illustrating a method of detecting variation of the end section of the sheet member.
Figure 8B:
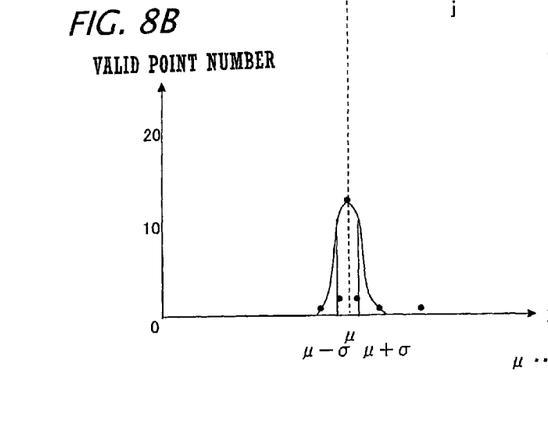
Figure 8C:
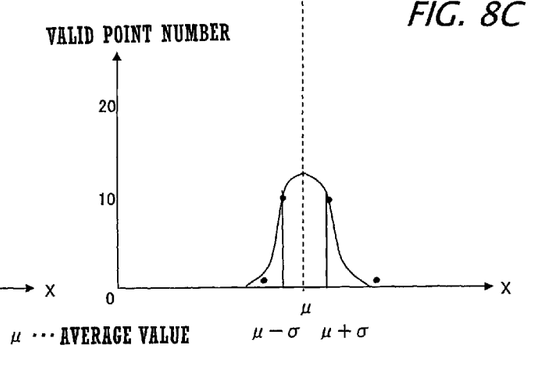

An example of the derivation of the member end section variation will be described with reference to FIGS. 8A to 8C. FIG. 8A shows data in which valid points are checked in a similar way to step a4. After the valid points (width-directional ends) for the respective rows are detected in this way, as shown in FIGS. 8B and 8C, a standard deviation $\sigma$ which is a variation index is calculated using the width-directional positions of the valid points as data in the respective width-directional end sections 78 and 80 ($\mu$ is an average value in the figure). If the standard deviation $\sigma$ is a predetermined threshold value or less, the variation of the width-directional positions in the width-directional end sections 78 and 80 of the sheet member 70 is small and the winding state of the sheet member 70 is preferable. In this example, the variation is small in the end section 80 on the left side in FIG. 8B, but the variation is large in the end section 78 on the right side in FIG. 8C, which is not preferable.

Next, in step a6, the width size of the sheet member 70 is calculated by the member width calculating unit 42. Specifically, the member width calculating unit 42 may calculate the width of the sheet member 70 from the positions of the width-directional opposite end sections 78 and 80 of the sheet member 70 as specified above, the traveling speed of the forming drum 50 and the number of measurement frames of the two-dimensional laser sensor 12.

Then, in step a7, the shift amount of the attachment position of the sheet member 70 is calculated by the member attachment position shift amount calculating unit 36. Specifically, the member attachment position shift amount calculating unit 36 calculates the respective width-directional central positions (that is, central positions in the drum width direction X) from the positions of the width-directional opposite end sections 78 and 80 of the sheet member 70 and the positions of the width-directional opposite end sections 62 and 64 of the forming drum 50, as calculated above. Thus, the shift amount of the width-directional central position of the sheet member 70 with respect to the width-directional central position of the forming drum 50 is calculated.

In the next step a8, the joint position variation deriving unit 44 detects joint positions between the leading end section 72 and the trailing end section 74 of the sheet member 70 for the respective columns on the basis of the distance data obtained in the matrix form, and derives variation of the detected joint positions. In the detection of the joint position, a change between the pieces of distance data which are adjacent to each other in the drum circumferential direction C is calculated for each column, and a position where the change is the maximum in the drum circumferential direction C is detected as the joint position of the sheet member 70.

An example of the derivation of the joint position variation will be described in detail with reference to FIGS. 9A and 9B. A difference (difference value) of the pieces of distance data (Z directional displacement) between two adjacent points from one end to the other end in the drum circumferential direction C (Y axial direction) is calculated with respect to the distance data obtained in the matrix form. In the example shown in FIGS. 9A and 9B, as indicated by an arrow m, from an upper end to a lower end in the Y axial direction, the difference of the pieces of distance data between two adjacent points is calculated. Further, the joint position of the sheet member 70 is detected using the position where the size of the difference is the maximum as a valid point. As shown in FIG. 2, in the two-dimensional laser sensor 12 which has the detection range D in the drum circumferential direction C, even though the thickness of the sheet member 70 is constant, a size difference due to the curved shape of the forming drum 50 occurs between the pieces of distance data which is arranged in the drum circumferential direction C. Thus, the change (difference) of the pieces of distance data between two adjacent points in the drum circumferential direction C is calculated, and thus, the joint position can be detected. This is because there is a rapid thickness change corresponding to one sheet of the thickness of the sheet member 70 and there is a significant difference in the distance data, in the joint position (see FIGS. 11A and 11B).

Figure 9A:
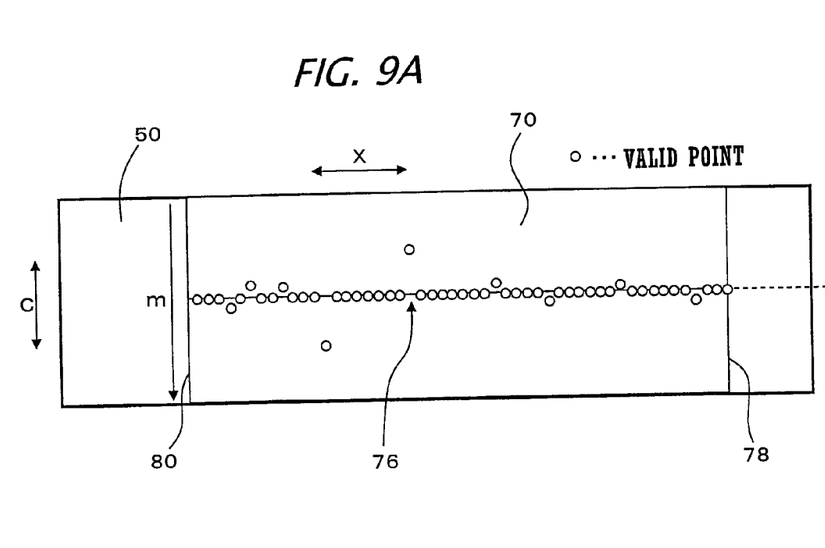
FIGS. 9A and 9B are diagrams illustrating a method of detecting variation of a joint position of the sheet member.
Figure 9B:
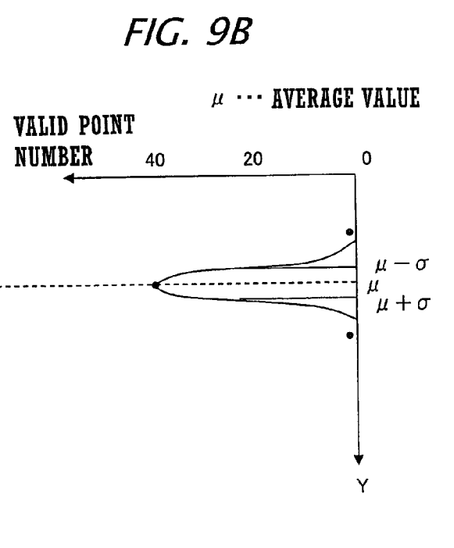
Figure 10A:
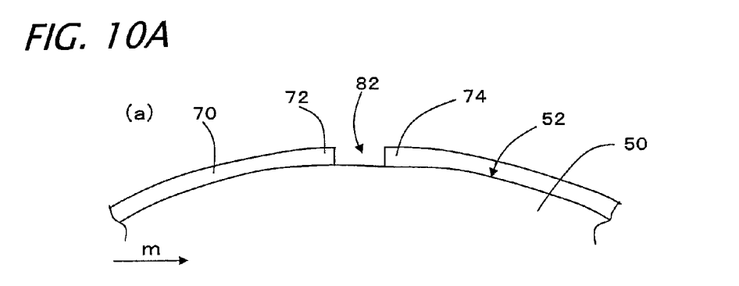
FIGS. 10A and 10B are diagrams illustrating a method of detecting an opening of a joint of the sheet member (in a case where the opening is present).
Figure 10B:
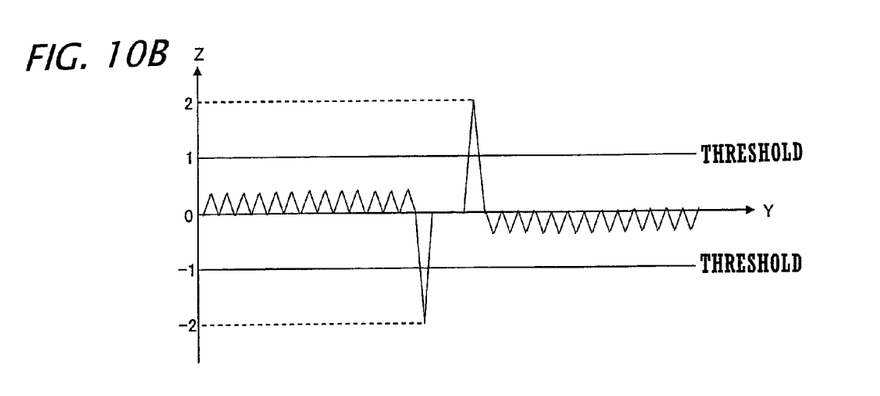

Here, in a case where the opening section is not present in the joint 76 as shown in FIGS. 9A and 9B, the position where the difference of the pieces of distance data between two adjacent points is the maximum is the joint position, but in a case where the opening section 82 is present in the joint 76, the position where the difference is the maximum as shown in FIGS. 10A and 10B may be two portions in the drum circumferential direction C. In step a8, since only the variation of the joint position instead of the opening section is derived, it is preferable to exclude such a possibility. Thus, the difference is set to a positive value or a negative value according to an overlapping direction of the joint 76, and it is accordingly preferable for detecting the joint position.

Figure 11A:
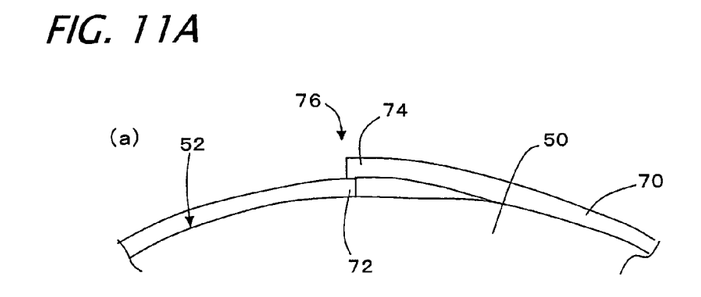
FIGS. 11A and 11B are diagrams illustrating a method of detecting an opening of a joint of the sheet member (in a case where the opening is not present).
Figure 11B:
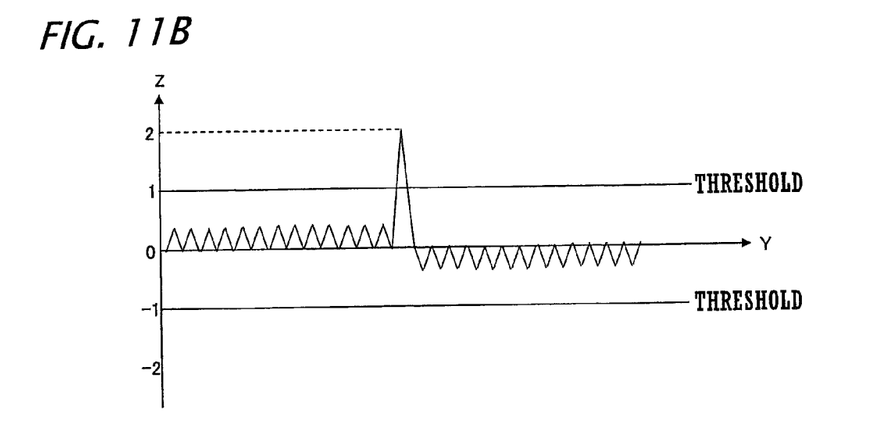

For example, as shown in FIG. 1, in the case of the joint 76 in which the lower trailing end section 74 is overlapped on the upper leading end section 72, if the valid point is calculated from the upper end to the lower end as shown in FIG. 9A, since the thickness is significantly increased in the joint position, as shown in FIG. 11B, the difference at the joint position becomes the positive value. Thus, by regulating the positive maximum value as the valid point, it is possible to exclude a possibility that two valid points are detected.

The above-mentioned valid point detection is repeatedly performed from the left end 80 to the right end 78 of the sheet member 70, for example, over the entire drum width direction X. After the valid points (joint positions) are detected with respect to the respective columns in this way, as shown in FIG. 9B, using the positions of the valid points in the drum circumferential direction C (Y axial direction) as data, the standard deviation σ which is the variation index is calculated (μ is an average value in the figure). If the standard deviation σ is a predetermined threshold value or less, disorder of the joint 76 is small, which represents that the joint state is preferable.

Next, in step a9, the presence or absence of the opening of the joint 76 is detected by the opening detecting unit 45. Specifically, the difference between the pieces of distance data which are adjacent to each other in the drum circumferential direction C is calculated for each column on the basis of the distance data obtained in the matrix form, and the differences which are a threshold value or larger in absolute values are summed for each column. Thus, it is detected whether a concave portion due to the opening section 82 is present in the joint 76 in the drum circumferential direction C.

An example of such a detecting method of the opening will be described in detail with reference to FIGS. 10A and 10B and FIGS. 11A and 11B. In a similar way to step a8, with respect to the distance data obtained in the matrix form, the difference (difference value) of the distance data (Z directional displacement) in two adjacent points from one end to the other end in the drum circumferential direction C (Y axial direction) is calculated. Then, as shown in FIGS. 11A and 11B, in the normal joint 76 which does not have the opening, the difference becomes a large positive (+) or negative (−) value in the joint position, but in other positions, the value according to the curved shape of the forming drum 50 becomes small. On the other hand, as shown in FIGS. 10A and 10B, if there is a concave portion due to the opening section 82, the difference becomes a large negative (−) value corresponding to descent of the concave portion and a large positive (+) value corresponding to subsequent ascent. Thus, values of which an absolute value is larger than the difference corresponding to the curved shape of the forming drum 50 and an absolute value is smaller than the difference corresponding to the thickness of the sheet member 70 are determined as respective positive and negative threshold values. Further, among the calculated differences, the differences which have values which are equal to or larger than the threshold value in their absolute values are summed for each column. Thus, in the normal joint 76 without the opening shown in FIGS. 11A and 11B, since there is only one difference which is larger than the threshold value in its absolute value, in this case, the summed value of the differences becomes a large positive or negative value (the summed value becomes larger than the threshold value in its absolute value and "+2" in FIG. 1B). On the other hand, in a case where the opening shown in FIGS. 10A and 10B is present, since the differences which are larger than the threshold value in their absolute values have a large negative value ("−2" in FIG. 10B) and a large positive value ("+2" in FIG. 10B), if both the values are summed, the summed value becomes close to 0 (the summed value becomes smaller than the threshold value in its absolute value). Thus, in this way, by summing the differences which are equal to or larger than the threshold value and by comparing the summed value with the threshold value, it is possible to detect the presence or absence of the concave portion due to the opening section.

The detection of the opening is performed over the entire width of the sheet member 70. That is, for example, in FIG. 9A, the measurement is performed for each column from the left end position to the right end position of the sheet member 70. Further, in the entire drum width direction X, by counting the number of columns where the concave portion is detected, it is possible to detect the presence or absence of the opening section 82 in the joint 76.

It is determined by the determining unit 30 whether the winding state of the sheet member 70 is good or poor on the basis of each measurement result as obtained above (step a10). Specifically, by comparing each measurement result of the width size of the sheet member 70 obtained in step a6, the shift amount of the attachment position of the sheet member 70 obtained in step a7, the variation of the end section position of the sheet member 70 obtained in step a5, the variation of the joint position in the joint 76 obtained in step a8 and the presence or absence of the opening section 82 in the joint 76 obtained in step a9 with determination references, the determination of good or poor is performed.

Further, the determination result is displayed on the display unit 24 together with each measurement result and is stored in the storing unit 20 (step a11). In a case where the measurement result is displayed on the display unit 24, the obtained distance data may be waveform-processed to be displayed. Thus, it is easy to visually discriminate poor portions. Further, the waveform-processed image data may be stored in the storing unit 20 together with each measurement result. Further, when the measurement result is stored, an identification number such as a barcode number attached to each tire may be stored relating to the measurement result, and thus, it is easy to track the measurement result and a completed tire.

The above-described inspection method may be inserted in the pneumatic tire manufacturing process, and a product passed the inspection proceeds to a subsequent tire forming process to finally undergo a vulcanized-molding, thereby completing the pneumatic tire.

According to the above-described embodiment, the measurement is performed with respect to the sheet member 70 from one end to the other end in the drum width direction X, using the two-dimensional laser sensor 12 which has the detection range D along the drum circumferential direction C. Thus, it is possible to detect the sheet member 70 as a plane, and it is possible to precisely measure the attachment state of the sheet member 70. Further, it is possible to measure the state of the joint 76, the width and the attachment position of the sheet member 70 at a batch over the entire width of the sheet member 70.

Particularly, according to the present embodiment, by continuously measuring the opposite ends of the forming drum 50 in the drum width direction X so that the opposite ends are within the measurement range, even though the forming drum 50 and the two-dimensional laser sensor 12 are not precisely positioned in the drum width direction X, it is possible to measure the attachment position of the sheet member 70 with respect to the forming drum 50 with high accuracy. That is, by calculating the respective central positions with respect to the forming drum 50 and the sheet member 70 from the distance data, it is possible to measure the attachment position (shift amount) of the sheet member 70 on the forming drum 50 from the difference of the central positions with high accuracy.

Further, according to the present embodiment, by inserting the joint 76 in the detection range D of the two-dimensional laser sensor 12 which has the detection range D along the drum circumferential direction C, since scanning is performed on the sheet member 70 by the two-dimensional laser sensor 12, it is possible to detect the entire joint 76 on the surface thereof, and it is possible to precisely measure the state of the joint 76.

Further, according to the present embodiment, by deriving the variation of the positions recognized as the width-directional ends of the sheet member 70, if the variation is large, it is possible to detect that the joint 76 shifts in the drum width direction X, and it is possible to detect shift of the joint in the width direction.

Further, by detecting the joint positions for the respective columns with respect to the distance data obtained in the matrix form and deriving the variation of the positions, it is possible to detect whether the joint state of the joint 76 is disordered. Further, by detecting the concave portion in the drum circumferential direction C for each column, it is possible to detect the presence or absence of the opening in the joint 76.

As described above, according to the present embodiment, since the distance data is obtained by performing scanning in the drum width direction over the entire width of the sheet member using the two-dimensional laser sensor which has the detection range along the drum circumferential direction, it is possible to measure the winding state even in the joint with respect to the sheet member wound on the forming drum with high accuracy.

In the above embodiment, the two-dimensional laser sensor 12 is fixed and the forming drum 50 is moved in the drum width direction X, but instead, in a state where the forming drum 50 is fixed, while moving the two-dimensional laser sensor 12 in the drum width direction X, the measurement through the laser light emission (that is, obtainment of the distance data) may be performed.

Further, in the above embodiment, the circumferential direction portions which include the joint 76 of the sheet member 70 are the inspection target, but circumferential direction portions other than the joint 76 may be the inspection target. For example, in a state where a plurality of portions (for example, 3 to 6 portions) which is equivalently arranged in the circumferential direction is the inspection target and the joint 76 is included in one of them, the joint state in the joint 76 and the attachment state in the circumferential direction portions (attachment position or width size) may be inspected.

Further, in the above embodiment, the example in which the carcass ply is used as the sheet member 70 which is the inspection target has been described, but a different sheet member such as an inner liner or a belt may be the inspection target as long as it is wound on the forming drum. Further, a variety of modifications may be employed in a range without departing from the spirit of the invention.

What is claimed is:

1. An inspection method of a winding state of a sheet member wound on a forming drum, comprising:
    emitting laser light to the sheet member wound on the forming drum in a range which includes the entire width of the sheet member and obtaining distance data on a distance to a reflecting surface, using a two-dimensional laser sensor which has a detection range along a drum circumferential direction, while moving either the two-dimensional laser sensor or the forming drum in a drum width direction; and
    calculating positions of width-directional opposite end sections of the sheet member on the basis of the distance data,
    wherein the distance data is obtained in a matrix form in which a plurality of pieces of distance data which is arranged in the drum width direction forms a row and a plurality of pieces of distance data which is arranged in the drum circumferential direction forms a column,
    wherein width-directional ends of the sheet member are detected for each row, and the positions of the width-directional opposite end sections of the sheet member are calculated on the basis of the detection result, and
    wherein a difference between the pieces of distance data which are adjacent to each other in the drum width direction is calculated for each row, measurement points where the difference is equal to or larger than a threshold value are used as valid points for each row, width-directional positions of the valid points are detected as width-directional ends of the sheet member in the respective rows, the largest width-directional positions among the width-directional ends detected for each row are detected as the positions of the width-directional end sections of the sheet member, and thereby positions of width-directional opposite end sections of the sheet member are calculated.

2. The inspection method according to claim 1,
    wherein the distance data is obtained in a range which includes the entire width of the forming drum by the two-dimensional laser sensor, and
    wherein the positions of the width-directional opposite end sections of the sheet member and positions of the width-directional opposite end sections of the forming drum are calculated on the basis of the obtained distance data.

3. The inspection method according to claim 2,
    wherein the number of non-detection points having distance data which exceeds a measurement limit of the two-dimensional laser sensor is summed in the drum circumferential direction, and the summed number is compared with a threshold value to calculate the positions of the width-directional opposite end sections of the forming drum.

4. The inspection method according to claim 2,
    wherein each width-directional central position is calculated from the positions of the width-directional opposite end sections of the sheet member and the positions of the width-directional opposite end sections of the forming drum, and the shift amount of the width-directional central position of the sheet member with respect to the width-directional central position of the forming drum is calculated.

5. The inspection method according to claim 1,
    wherein the distance data is obtained while moving either the two-dimensional laser sensor or the forming drum in the drum width direction in a state where the rotational position of the forming drum and the two-dimensional laser sensor are aligned so that a joint between a leading end section and a trailing end section of the sheet member wound on the forming drum is within the detection range of the two-dimensional laser sensor, and
    wherein the joint is detected on the basis of the obtained distance data.

6. The inspection method according to claim 5,
    wherein a joint position between the leading end section and the trailing end section of the sheet member is detected for each column, and variation of the detected joint positions is derived.

7. The inspection method according to claim 6,
    wherein a change between the pieces of distance data which are adjacent to each other in the drum circumferential direction is calculated for each column, and the position where the change is the maximum in the drum circumferential direction is detected as the joint position of the sheet member.

8. The inspection method according to claim 5,
    wherein a difference between the pieces of distance data which are adjacent to each other in the drum circumferential direction is calculated for each column, and it is detected whether a concave section due to an opening is present in the joint of the sheet member in the drum circumferential direction by adding the differences which are equal to or larger than a threshold value in absolute values thereof for each column.

9. The inspection method according to claim 1,
wherein on the basis of the width-directional ends detected for each row, variation of the width-directional positions thereof is derived.

10. The inspection method according to claim 1,
wherein the largest width-directional positions among the width-directional ends detected for each row are specified as the positions of the width-directional end sections of the sheet member.

11. The inspection method according to claim 1,
wherein the width size of the sheet member is calculated from the positions of the width-directional opposite end sections of the sheet member.

12. An inspection apparatus of a winding state of a sheet member wound on a forming drum, comprising:
a two-dimensional laser sensor which has a detection range along a drum circumferential direction;
a movement device which moves either the two-dimensional laser sensor or the forming drum in a drum width direction;
a data obtaining unit which emits laser light by the two-dimensional laser sensor to the sheet member wound on the forming drum in a range which includes the entire width of the sheet member and obtains distance data on a distance to a reflecting surface, as either the two-dimensional laser sensor or the forming drum moves in the drum width direction; and
a data processing unit which calculates positions of width-directional opposite end sections of the sheet member on the basis of the distance data,
wherein the data obtaining unit obtains the distance data in a matrix form in which a plurality of pieces of distance data which is arranged in the drum width direction forms a row and a plurality of pieces of distance data which is arranged in the drum circumferential direction forms a column,
wherein the data processing unit includes a member end section position deriving unit which detects width-directional ends of the sheet member for each row, and calculates the positions of the width-directional opposite end sections of the sheet member on the basis of the detection result, and
wherein the data processing unit calculates the positions of the width-directional opposite end sections of the sheet member by calculating a difference between the pieces of distance data which are adjacent to each other in the drum width direction for each row, using measurement points where the difference is equal to or larger than a threshold value as valid points for each row, detecting width-directional positions of the valid points as width-directional ends of the sheet member in the respective rows, and detecting the largest width-directional positions among the width-directional ends detected for each row as the positions of the width-directional end sections of the sheet member.

13. The inspection apparatus according to claim 12,
wherein the data obtaining unit obtains the distance data in a range which includes the entire width of the forming drum by the two-dimensional laser sensor, and
wherein the data processing unit includes a member end section detecting unit which detects the positions of the width-directional opposite end sections of the sheet member on the basis of the distance data, and a forming drum end section deriving unit which calculates positions of the width-directional opposite end sections of the forming drum on the basis of the distance data.

14. The inspection apparatus according to claim 13,
wherein the data processing unit includes a member attachment position shift amount calculating unit which calculates each width-directional central position from the positions of the width-directional opposite end sections of the sheet member and the positions of the width-directional opposite end sections of the forming drum, and calculates the shift amount of the width-directional central position of the sheet member with respect to the width-directional central position of the forming drum.

15. The inspection apparatus according to claim 12, further comprising:
a positioning unit which aligns the rotational position of the forming drum and the two-dimensional laser sensor so that a joint between a leading end section and a trailing end section of the sheet member wound on the forming drum is within the detection range of the two-dimensional laser sensor,
wherein the data processing unit includes a joint detecting unit which detects the joint on the basis of the distance data obtained by the data obtaining unit.

16. The inspection apparatus according to claim 15,
wherein the joint detecting unit includes a joint position variation deriving unit which detects a joint position between the leading end section and the trailing end section of the sheet member for each column, and derives variation of the detected joint positions.

17. The inspection apparatus according to claim 15,
wherein the joint detecting unit includes an opening detecting unit which calculates a difference between the pieces of distance data which are adjacent to each other in the drum circumferential direction for each column, and detects whether a concave section due to an opening is present in the joint of the sheet member in the drum circumferential direction by adding the differences which are equal to or larger than a threshold value in absolute values thereof for each column.

18. The inspection apparatus according to claim 12,
wherein the data processing unit includes a member width calculating unit which calculates the width size of the sheet member from the positions of the width-directional opposite end sections of the sheet member.

* * * * *